United States Patent
Fiske et al.

(10) Patent No.: US 10,841,378 B2
(45) Date of Patent: *Nov. 17, 2020

(54) STORAGE NETWORK TIERING

(71) Applicant: International Business Machines Corporation, Armonk, NY (US)

(72) Inventors: Rahul M. Fiske, Pune (IN); Shweta V. Kulkarni, Nasik (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,769

(22) Filed: Jul. 2, 2019

(65) Prior Publication Data
US 2019/0327305 A1    Oct. 24, 2019

Related U.S. Application Data

(63) Continuation of application No. 15/584,942, filed on May 2, 2017, now Pat. No. 10,440,113.

(51) Int. Cl.
*H04L 29/08* (2006.01)

(52) U.S. Cl.
CPC .......... *H04L 67/1097* (2013.01); *H04L 67/10* (2013.01)

(58) Field of Classification Search
CPC ........................ H04L 67/1097; H04L 29/08
See application file for complete search history.

(56) References Cited

U.S. PATENT DOCUMENTS

| | | | |
|---|---|---|---|
| 7,606,934 B1 | 10/2009 | Vengerov et al. | |
| 8,356,147 B2 | 1/2013 | Kawaguchi | |
| 8,788,702 B2 | 7/2014 | Padia et al. | |
| 8,832,334 B2 | 9/2014 | Okita | |
| 8,918,537 B1 | 12/2014 | Sandstrom et al. | |
| 9,213,709 B2 | 12/2015 | Patiejunas et al. | |
| 9,489,137 B2 | 11/2016 | Lewis et al. | |
| 9,811,439 B1 * | 11/2017 | Barrett | G06F 11/26 |
| 9,811,552 B1 * | 11/2017 | Noguchi | G06F 16/2365 |
| 2010/0030929 A1 | 2/2010 | Ben-Yacov et al. | |
| 2013/0346444 A1 | 12/2013 | Makkar et al. | |
| 2015/0254018 A1 | 9/2015 | Lam et al. | |
| 2016/0062761 A1 | 3/2016 | Muroyama et al. | |
| 2018/0267707 A1 | 9/2018 | Barzik et al. | |

OTHER PUBLICATIONS

List of IBM Patent or Patent Applications Treated as Related Filed on May 2, 2017.

* cited by examiner

*Primary Examiner* — El Hadji M Sall
(74) *Attorney, Agent, or Firm* — Kunzler Bean & Adamson

(57) ABSTRACT

Methods and systems for storage network tiering are provided. One method includes receiving input/output (I/O) requests from a set of client devices via one of a plurality of communication paths and performing I/O operations on data in one or more storage devices based on corresponding I/O requests. The method further includes determining locations storing each data set in the one or more storage devices and transmitting, to the set of client devices, recommendations of a communication path in the plurality of communication paths for transmitting subsequent I/O requests that access a particular data set based on the location storing the particular data set. Systems and computer program products for performing the above method are also provided.

20 Claims, 5 Drawing Sheets

STORAGE NETWORK TIERING

REFERENCE TO RELATED APPLICATION

The present application is a continuation of and claims priority to U.S. patent application Ser. No. 15/584,942 filed on May 2, 2017, the contents of which are incorporated herein by reference in their entirety.

FIELD

The subject matter disclosed herein relates to storage networks and more particularly relates to storage network tiering.

BACKGROUND

Typically, different storage device types include different storage characteristics. For example, some storage devices have a relatively high storage capacity and a relatively high latency characteristic, while other storage devices have a low latency characteristic and a relatively low storage capacity. One of the goals for storage networks is balancing the desire to store large amounts of data and the desire to access the stored data with the least amount of latency.

Some network systems take advantage of these differing storage characteristics by using different types of storage devices to store different data. For example, data that is frequently accessed may be stored on a storage device that includes a relatively low latency characteristic, while large amounts of data that are infrequently accessed may be stored on a storage device that includes a relatively high latency characteristic and a high storage capacity. Therefore, a storage network can take advantage of the latency and storage capacity characteristics of various storage devices to reduce the overall latency of the storage network.

While storing data on different storage devices can reduce the overall latency of a storage network, previous storage networks utilize the same communication path and/or communication protocol to process input/output requests regardless of the type of storage device storing the data and/or where the data is located or stored in the storage network. Accordingly, at least some previous storage networks may not be operating as efficiently as possible.

BRIEF SUMMARY

Methods and systems for storage network tiering are disclosed. One method includes receiving input/output (I/O) requests from a set of client devices via one of a plurality of communication paths and performing I/O operations on data in one or more storage devices based on corresponding I/O requests. The method further includes determining locations storing each data set in the one or more storage devices and transmitting, to the set of client devices, recommendations of a communication path in the plurality of communication paths for transmitting subsequent I/O requests that access a particular data set based on the location storing the particular data set.

A system includes an I/O module that receives I/O requests from a set of client devices and performs I/O operations on data in one or more storage devices based on corresponding I/O requests. Each respective I/O operation is received via one of a plurality of communication paths and is performed based on instructions from a client device issuing a corresponding I/O request. The system further includes a location module that determines locations storing each data set in the one or more storage devices and a response module that transmits, to the set of client devices, recommendations of a communication path in the plurality of communication paths for transmitting subsequent I/O requests that access a particular data set based on the location storing the particular data set.

Also disclosed are computer program products comprising a computer readable storage medium having program instructions embodied therewith. Some program instructions that are executable by a processor cause a processor to receive I/O requests from a set of client devices via one of a plurality of communication paths and perform I/O operations on data in one or more storage devices based on corresponding I/O requests. The instructions further cause the processor to determine locations storing each data set in the one or more storage devices and transmit, to the set of client devices, recommendations of a communication path in the plurality of communication paths for transmitting subsequent I/O requests that access a particular data set based on a location storing the particular data set.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
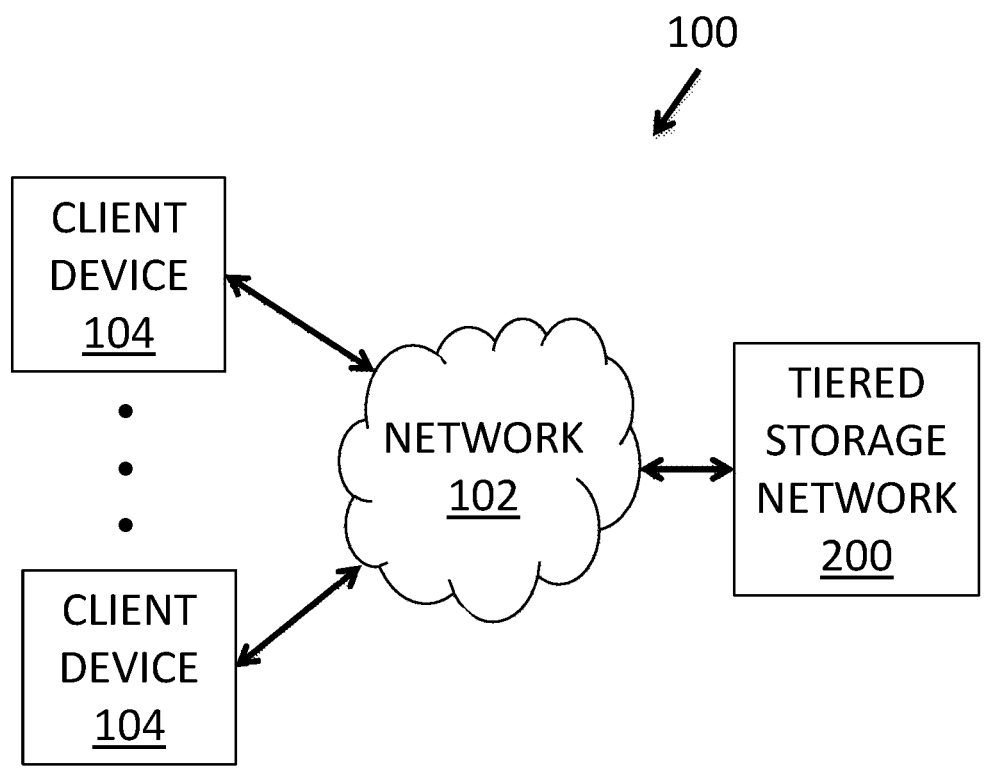
FIG. 1 is a schematic block diagram illustrating one embodiment of a computing network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Methods and systems for tiering storage networks are disclosed. One method includes receiving input/output (I/O) requests from a set of client devices via one of a plurality of communication paths and performing I/O operations on data in one or more storage devices based on corresponding I/O requests. The method further includes determining locations storing each data set in the one or more storage devices and transmitting, to the set of client devices, recommendations of a communication path in the plurality of communication paths for transmitting subsequent I/O requests that access a particular data set based on the location storing the particular data set.

In various embodiments, transmitting the recommendations includes transmitting status signals to a client subsequent to performing the I/O operations and a recommendation forms at least a portion of a status signal. In some embodiments, transmitting the status signals includes transmitting one or more status signals with SENSE code and at least a portion of the SENSE code comprises the recommendation.

The recommendations may be based on correlations between the location of a particular data set and a relative speed of each communication path. In some embodiments, the method further includes recommending a different communication path for a subsequent I/O when a correlation between the location of the particular data set and the relative speed of a current communication path accessing the particular data set are a mismatch. Recommending, in some embodiments, includes recommending a faster communication path when the particular data set is located on a first tier storing data sets that are accessed relatively frequently and recommending a slower communication path when the particular data set is located on a second tier storing data sets that are accessed relatively infrequently.

A system includes an I/O module that receives I/O requests from a set of client devices and performs I/O operations on data in one or more storage devices based on corresponding I/O requests. Each respective I/O operation is received via one of a plurality of communication paths and is performed based on instructions from a client device issuing a corresponding I/O request. The system further includes a location module that determines locations storing each data set in the one or more storage devices and a response module that transmits, to the set of client devices, recommendations of a communication path in the plurality of communication paths for transmitting subsequent I/O requests that access a particular data set based on the location storing the particular data set.

In various embodiments, a recommendation forms at least a portion of a status signal transmitted to a client subsequent to performing an I/O operation. The status signal, in some embodiments, includes SENSE code and at least a portion of the SENSE code includes the recommendation.

Each of the plurality of communication paths, in some embodiments, provides a different speed. In one embodiment, a first recommendation includes a first suggestion to use a relatively fast communication path for relatively frequently accessed data sets and a second recommendation includes a second suggestion to use a relatively slow communication path for relatively infrequently accessed data sets. In another embodiment, one or more data sets are replicated for storage in a different location and a recommendation recommends use of a relatively slow communication path for replicating the one or more data sets.

In some embodiments, at least one storage device includes a topology with a plurality of tiers that store a plurality of data sets, each data set is stored on a tier based on a frequency of access, and the recommendations are based on the tier storing each respective data set. In one embodiment, a first recommendation includes a first suggestion to use a relatively fast communication path for first data set on a first tier storing relatively frequently accessed data sets and a second recommendation includes a second suggestion to use a relatively slow communication path for second data sets on a second tier storing relatively infrequently accessed data sets.

The recommendations, in various embodiments, are based on correlations between the location of the particular data set and a relative speed of each communication path. In some embodiments, the response module further recommends a different communication path for a subsequent I/O when a correlation between the location of the particular data set and the relative speed of a current communication path accessing the particular data set are a mismatch. In further embodiments, the response module recommends a faster communication path when the particular data set is located on a first tier storing data sets that are accessed relatively frequently and a slower communication path when the particular data set is located on a second tier storing data sets that are accessed relatively infrequently.

Also disclosed are computer program products comprising a computer readable storage medium having program instructions embodied therewith. Some program instructions that are executable by a processor cause a processor to receive I/O requests from a set of client devices via one of a plurality of communication paths and perform I/O operations on data in one or more storage devices based on corresponding I/O requests. The instructions further cause the processor to determine locations storing each data set in the one or more storage devices and transmit, to the set of client devices, recommendations of a communication path in the plurality of communication paths for transmitting subsequent I/O requests that access a particular data set based on a location storing the particular data set.

In various embodiments, the program instructions causing the processor to transmit the recommendations include program instructions causing the process to further transmit status signals to a client subsequent to performing the I/O operations. In some embodiments, one or more status signals include SENSE code and at least a portion of the SENSE code includes a recommendation.

The recommendations, in further embodiments, are based on correlations between the location of the particular data set and a relative speed of each communication path and the program instructions further cause the processor to recommend a different communication path for a subsequent I/O when a correlation between the location of the particular data set and the relative speed of a current communication path accessing the particular data set are a mismatch. In some embodiments, the program instructions causing the processor to recommend the different communication path include program instructions further causing the processor to recommend a faster communication path when the particular data set is located on a first tier storing data sets that are accessed relatively frequently and recommend a slower communication path when the particular data set is located on a second tier storing data sets that are accessed relatively infrequently.

The description of elements in each figure below may refer to elements of proceeding figures. Like numbers refer to like elements in all figures, including alternate embodiments of like elements.

FIG. 1 is a schematic block diagram illustrating one embodiment of a computing network 100. At least in the illustrated embodiment, the computing network 100 includes, among other components, a network 102 coupling one or more client devices 104 to a tiered storage network 200, which are described below.

The network 102 may be any wired and/or wireless network 102 (e.g., public and/or private computer networks in any number and/or configuration (e.g., the Internet, an intranet, a cloud network, etc.)) that is known or developed in the future that enables one or more client devices 104 to be coupled to and/or in communication with tiered storage network 200. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

A client device 104 can be any computing hardware and/or software (e.g., a thick client, a thin client, or hybrid thereof) that is known or developed in the future that is capable of accessing the tiered storage system 200 via the network 102. A client device 104, as part of its respective operation, may rely on sending input/output (I/O) requests to the tiered storage system 200 to write data, read data, and/or modify data, etc. For instance, a client device 104 can transmit I/O requests to write, read, store, communicate, propagate, and/or transport instructions, data, computer programs, software, code, routines, etc., to the tiered storage system 200. In various embodiments, a client device 104 may be a server and/or or other computing device and may further form at least a portion of a computing node in a network. While FIG. 1 depicts the computing network 100 as including three client devices 104, other embodiments may include one client device 104, two client devices 104, or more than three client devices 104 such that the various embodiments of the computing network 100 are not limited to three client devices 104.

The client device(s) 104 can access the tiered the storage system 200 and/or communication with the tiered storage system 200 can be initiated by the client device(s) 104 through a network socket (not shown) utilizing one or more inter-process networking techniques. In various embodiments, the client device(s) 104 and the tiered storage system 200 may comprise at least a portion of a client-server model.

Figure 2:
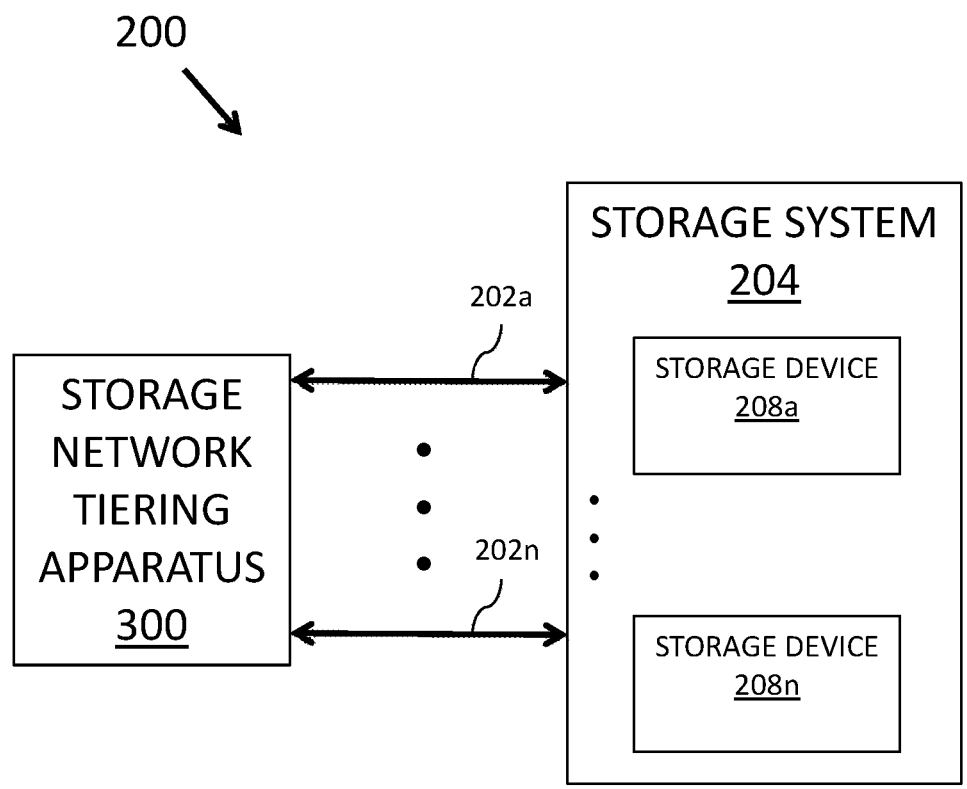
FIG. 2 is a schematic block diagram illustrating one embodiment of a tiered storage network included in the computing network of FIG. 1.

FIG. 2 is a schematic block diagram illustrating one embodiment of the tiered storage network 200 forming at least a portion of the computing network 100. At least in the illustrated embodiment, the tiered storage network 200 includes, among other components, multiple communication paths 202a through 202n coupling a storage system 204 to a storage network tiering apparatus 300.

Commination paths 202a through 202n (also simply referred to individually, in various groups, or collectively, as communication path(s) 202) may be any type of communication path or fabric employing any type of communication protocol or switch (e.g., a corresponding switch 206a through switch 206n) that is known or developed in the future and is capable of facilitating communication between the storage system 204 and the storage network tiering apparatus 300 (and the client device(s) 104). Examples of a communication path 202 employing a suitable communication protocol include, but are not limited to, Internet Protocol (IP), Transmission Control Protocol/Internet Protocol (TCP/IP), Ethernet, Fibre Channel (FC), Remote Direct Memory Access (RDMA), InfiniBand (IB), Advanced Technology Attachment (ATA), ATA-over-Ethernet (AoE), parallel ATA (PATA), Serial ATA (SATA), Small Computer System Interface (SCSI), Internet Small Computer System Interface (iSCSI), an optical network, Network File System (NFS), FC-over-IP (FCIP), Non-Volatile Memory Express (NVMe), NVMe-over-RDMA, iSCSI Extensions for RDMA (iSER), SCSI RDMA Protocol (SRP), Fibre Channel-over-Ethernet (FCoE), Enterprise Systems Connection (ESCON), Fibre Connection (FICON), ATA-Over-Ethernet (AoE), and Internet Fibre Channel Protocol (IFCP), etc., among other examples that are possible and contemplated herein.

The various communication protocols employed by communication paths 202 include characteristics that differ in terms of, for example, bandwidth capabilities, latency capabilities, and/or processor utilization, etc., among other performance characteristics. That is, different communication protocols may use different amounts of bandwidth, transmit/receive data at different rates or speeds, and/or use different amounts of processing power, etc., when transmitting/receiving I/O operations and/or requests. In other words, various communication protocols can use comparatively or relatively more or less bandwidth, transmit/receive data at comparatively faster or slower rates/speeds, and/or use comparatively or relatively more or less processing power, etc., when transmitting/receiving I/O operations and/or I/O requests. Accordingly, various embodiments described herein, utilize these varying characteristics in communication paths 202 in a tiered topology to more efficiently store data, process I/O requests, and/or perform I/O operations, etc., in what can be referred to as network tiering.

In various embodiments, network tiering may include at least two different types of communication paths 202 and/or employing at least two different communication protocols in the tiered storage network 200. In one non-limiting example, communication path 202a is an iSCSI communication path and communication path 202n is an iSER communication path (see FIG. 3A). In another non-limiting example, communication path 202a is a NVMe-over-RDMA communication path and communication path 202n is an iSER communication path 202 (see FIG. 3B). In a further non-limiting example, communication path 202a is a Fibre Channel communication path and communication path 202n is an Ethernet communication path (see FIG. 3C). As one skilled in the art will appreciate, other example combinations of communication paths 202 employing at least two different communication protocols are possible and each are contemplated herein. Further, various embodiments may also include more than three communication paths 202 employing different communication protocols.

In some embodiments, at least two communication paths 202 employ the same communication protocol. Further, some embodiments include at least two communication paths 202 employing the same communication protocol and at least two communication paths 202 employing different communication protocols.

The storage system 204 may include, among other components, one or more storage devices 208a through 208n. Storage devices 208a through 208n (also simply referred to individually, in various groups, or collectively, as storage device(s) 208) may be any type of storage device that is known or developed in the future and capable of storing data. In various embodiments, a storage device 208 may include one or more non-transitory computer-usable mediums (e.g., readable, writable, modifiable, etc.), which may include any non-transitory and/or persistent apparatus or device that can contain, store, communicate, propagate, and/or transport instructions, data, computer programs, software, code, routines, etc., for processing by or in connection with a computer processing device or the storage network tiering apparatus 300.

At least in the illustrated embodiment, a storage device 208 can be implemented as a flash memory device (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A storage device 208, in various embodiments, may include non-volatile/persistent hardware and/or software configured to perform long-term data storage operations, including, but not limited to, data archiving, data backup, data mirroring, replicating data, etc. For instance, a storage device 208 may include non-volatile and/or persistent hardware and/or software configured for performing long-term data storage operations, which may include write operations, read operations, read-write operations, etc., among other operations.

In various embodiments, the storage system 204 includes two or more different types of storage devices 208. The different types of storage devices 208, in some embodiments, are arranged in a tiered topology or structure. The tiers may be based on one or more varying performance characteristics of the different storage devices 208.

For example, a higher or top tier may include a Flash memory device and be considered a hot or fast tier because Flash memory typically includes a relatively low latency characteristic and/or a fast/high speed, but a relatively low or small storage capacity compared to other memory types. In a further example, a lower or bottom tier may include tape drive and be considered a cold or slow tier because a tape drive typically includes a relatively high latency characteristic and/or slow/low speed, but a relatively high or large storage capacity compared to other memory types. Other types of memory devices may be included in the tier(s) between, for example, a Flash memory device and tape drive because other types of memory devices may include latency characteristics and/or storage capabilities between that of Flash memory devices and tape drives.

Data, in some embodiments, may be stored in storage devices 208 in accordance with the quantity and/or frequency with which each data set (e.g., a data portion, a data chunk, a data segment, a data object, etc.) of the data is accessed or on which an I/O operation is performed. In some embodiments, data sets are stored in a tier that corresponds to the frequency with which each respective data set is accessed. For example, a first data set that is frequently accessed (e.g., read, written to, modified, etc.) may be stored or located on a Flash memory device that corresponds to a hot tier, while a second data set that is less frequently accessed may be stored/located on a DRAM device corresponding to a warm tier and an infrequently accessed third data set may be stored/located on a tape drive that corresponds to a cold tier.

In further embodiments, data may be stored in storage devices 208 in accordance with the quantity of data or size of each data set. For example, a first data set that is relatively small may be stored or located on a Flash memory device that corresponds to a hot tier, while a relatively medium-sized second data set may be stored/located on a DRAM device corresponding to a warm tier and relatively large third data set may be stored/located on a tape drive that corresponds to a cold tier.

In one embodiment, the storage system 204 includes multiple storage devices 208 arranged into four tiers. Here, a first or hot tier includes one or more Flash memory devices, a second or warm tier includes one or more HDDs, a third or cool tier includes one or more near-line drives, and a fourth or cold tier includes one or more tape drives. Various other embodiments may include two storage devices 208 providing two storage tiers, three storage devices providing three storage tiers, or any number of storage devices 208 providing any number of storage tiers greater than four storage devices 208 such that the storage system 204 can include any number of storage tiers greater than two storage tiers. Other embodiments contemplate other topologies in which the characteristics of a storage device 208 corresponds to a particular storage tier and a correlation exists between the frequency of access and/or size of a data set and the storage tier where each data set is stored/located.

A storage device 208 may include hardware and/or software to divide and/or partition its physical storage space into two or more smaller storage units that can also be arranged into two or more corresponding storage tiers. The smaller storage units may be arranged into two or more storage tiers similar to the various embodiments discussed elsewhere herein. That is, physical space in a storage device 208 may be partitioned to include any number of storage tiers that store data sets on a particular tier based on the frequency of access and/or the size of each respective data set. For example, relatively frequently accessed data sets may be stored/located on a hot tier, while less frequently accessed data sets and relatively infrequently accessed data sets may be stored/located on a warm/cool tier and a cold tier, respectively.

Figure 3:
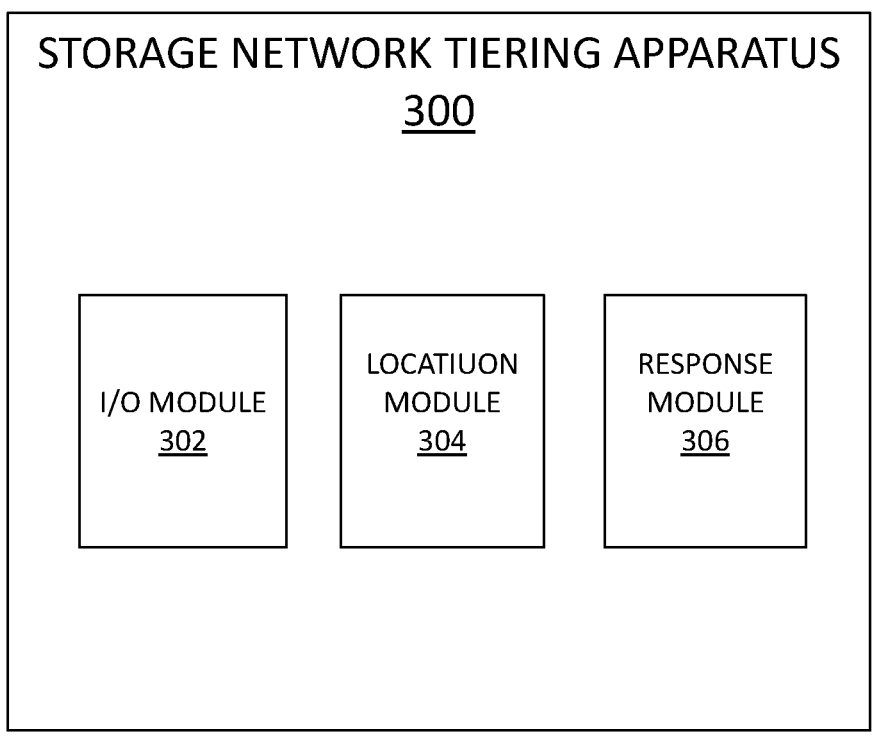
FIG. 3 is a schematic block diagram illustrating one embodiment of an apparatus for tiering storage networks included in the tiered storage network of FIG. 2.

With reference now to FIG. 3, one embodiment of the storage network tiering apparatus of the tiered storage network 200 is illustrated. At least in the illustrated embodiment, the apparatus 300 includes, among other components, an input/output (I/O) module 302, a location module 304, and a response module 306. In various embodiments, the apparatus 300 is a storage controller.

In one embodiment, the I/O module 302 receives I/O requests (e.g., read requests, write requests, read-write requests, etc.) from a set of client devices 104 and performs I/O operations (e.g., read operations, write operations, read-write operations, etc.) on data sets including one or more data set(s) in one or more of storage devices 208 based on the corresponding I/O requests. Each I/O operation is performed via one of communication paths 202 based on instructions from the client device 104 issuing or transmitting the corresponding I/O request.

The location module 304, in some embodiments, determines the location(s) in storage device(s) 102 storing each data set. That is, the location module 304 can track which storage tier provided by the storage devices 208a through 208n and/or by a single storage device 208 is storing each data set of a data set. In other words, the location module 304 tracks which storage device 208 and/or which partition in a storage device 208 is storing each data set.

The response module 306 transmits, to the set of client devices 104, recommendations of a communication path 202 in a plurality of communication paths for transmitting subsequent I/O requests that access a particular data set based on the location storing the particular data set. In some embodiments, the recommendations are based on correlations between the location of the particular data set and a relative speed of each communication path. In one embodiment, the response module 306 recommends a different communication path 202 for a subsequent I/O operation when the correlation between the location of a particular data set and the relative speed of a current communication path 202 accessing the particular data set are mismatched.

For example, the response module 306 may recommend, suggest, or hint that a client device 104 that is currently using an iSCSI communication path 202 for I/O operations on a data set stored/located on a hot tier use a Fibre Channel communication path 202 for future I/O operations on the data set because the Fibre Channel communication path 202 can provide a higher speed or have less latency than the iSCSI communication path 202, which may be preferable for a data set that is relatively frequently accessed. Conversely, the response module 306 may recommend that a client device 104 that is currently using Fibre Channel communication path 202 for I/O operations on a data set stored/located on a cold tier use an iSCSI communication path 202 for future I/O operations on the data set because the data set is relatively infrequently accessed and switching to the iSCSI communication path 202 can free up the Fibre Channel communication path 202 for I/O operations on data sets that are more frequently accessed (e.g., stored/located on a warmer or higher tier). In other words, a recommendation from the response module 306 may include a suggestion or hint to use a faster communication path when the particular data set is located on a tier storing data sets that are accessed relatively frequently and a suggestion or hint to use a slower communication path when the particular data set is located on a tier storing data sets that are accessed less frequently or relatively infrequently.

In various embodiments, a recommendation includes a suggestion or hint to use a relatively slow communication path 202 for replicating the one or more data sets or data sets to different locations in storage devices 208. That is, the response module 306 may recommend that a client device 104 use, for example, iSCSI when replicating a data set to, for example, a tape drive, although other possibilities/options are possible and contemplated herein.

In various embodiments, a recommendation forms at least a portion of a status signal transmitted to a client device 104 subsequent to an I/O operation being performed on a data set. The status signal, in one embodiment, includes SENSE code, which can be the standardized collection of SCSI command that uses code and/or coded values to communicate requests and responses between an initiator (e.g., the client device(s) 104) and a target (e.g., tiered storage network 200). In a further embodiment, at least a portion of the SENSE code comprises the recommendation, which may be considered additional SENSE code and/or value(s).

Figure 4:
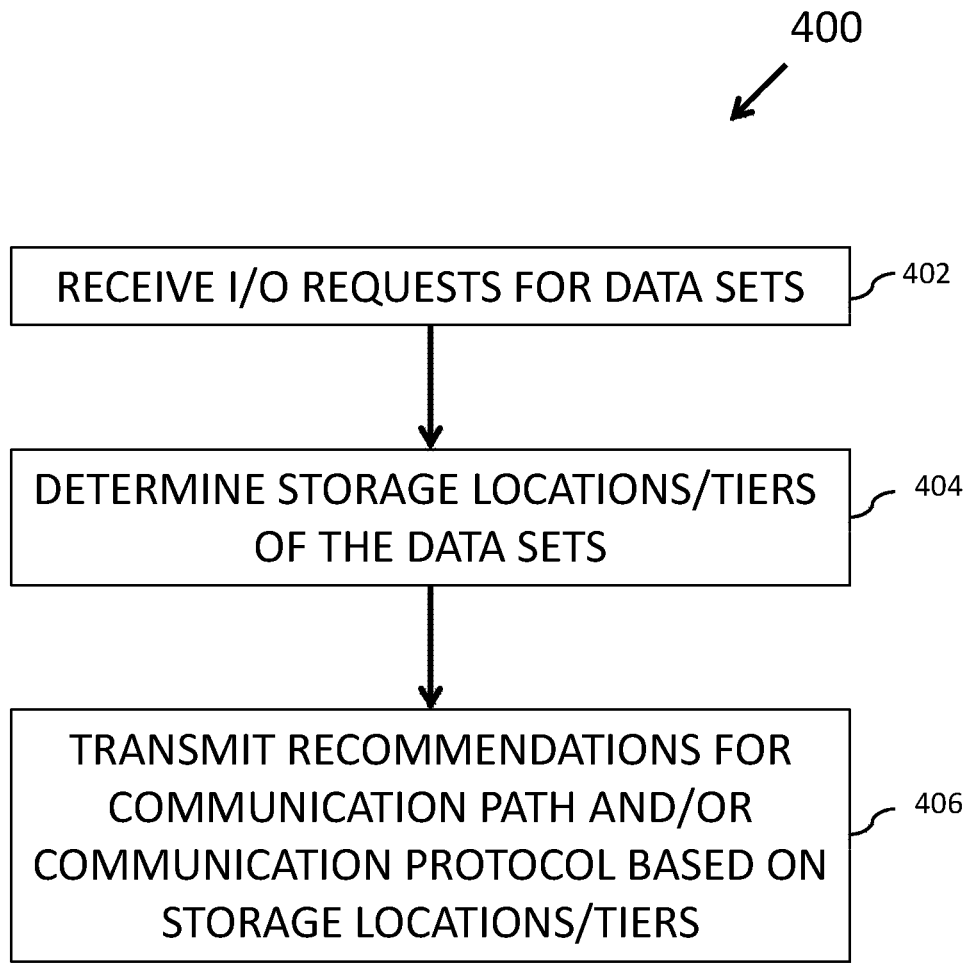
FIG. 4 is a schematic flow chart diagram illustrating one embodiment of a method for tiering storage networks.

With reference now to FIG. 4, a schematic flow chart diagram illustrating one embodiment of a method 400 for storage network tiering is illustrated. At least in the illustrated embodiment, method 400 begins by receiving I/O requests (e.g., by the I/O module 302) from a set of client devices 104 (block 402). In various embodiments, each respective I/O request is received via one of a plurality of communication paths 202.

The I/O operations are performed (e.g., by the I/O module 302) on data in one or more of the storage devices 208 based on I/O requests corresponding to the I/O operations (block 404) and locations storing each data set in the one or more storage devices 208 are determined (e.g., by the tracking module 304) (block 404).

Recommendations of a communication path 202 in the plurality of communication paths for transmitting subsequent I/O requests that access a particular data set are transmitted to the set of client devices 104 (block 406). The recommendations, in various embodiments, are based on the location(s) storing the particular data set. In some embodiments, the recommendations are based on a storage tier storing the data set similar to various embodiments described elsewhere herein. Further, the recommendations may be included as a portion of a status signal and/or SENSE code/value(s) similar to the various embodiments discussed elsewhere herein.

Figure 5:
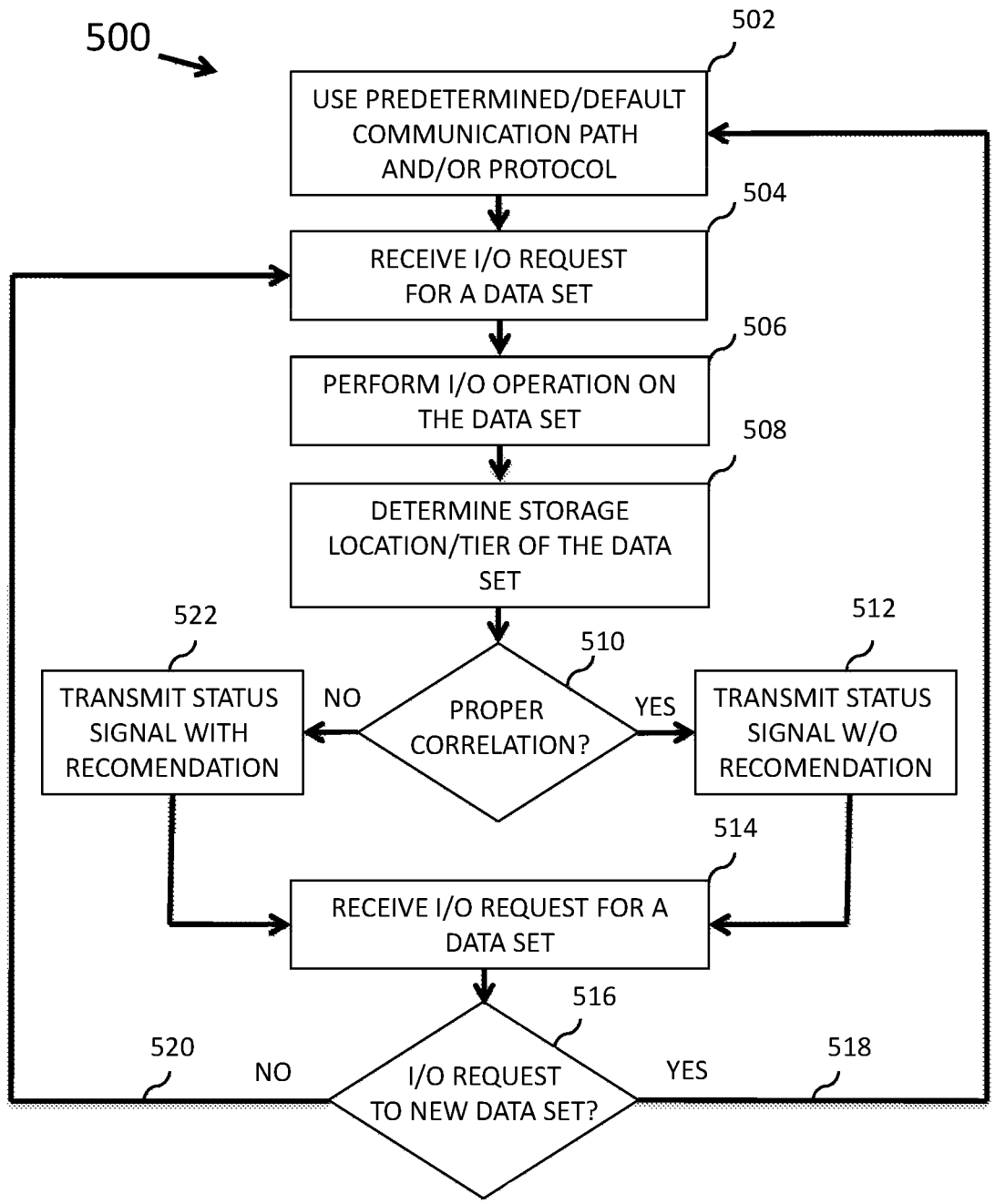
FIG. 5 is a schematic flow chart diagram illustrating another embodiment of a method for tiering storage networks.

Referring to FIG. 5, a schematic flow chart diagram illustrating another embodiment of a method 500 for storage network tiering is illustrated. At least in the illustrated embodiment, method 500 begins by initially using a predetermined or default communication path 202 and/or communication protocol for accessing each data set stored in one or more storage devices 208 (block 502).

In various embodiments, the initial communication path 202 and/or communication protocol may be the slowest or the fastest communication path 202 and/or communication protocol provided in a storage network. In other embodiments, the initial communication path 202 and/or communication protocol may be a communication path 202 and/or communication protocol with any speed, bandwidth, or other performance characteristic that is between the slowest or the fastest communication path 202 and/or communication protocol.

An I/O request to access a data set in the storage device(s) 104 is received (block 504) and an I/O operation corresponding to the I/O request is performed on the data set utilizing the initial or default communication path 202 and/or communication protocol (block 506). The location or storage tier in the storage device(s) 208 storing the data set is determined (block 508).

In some embodiments, the method 500 further includes determining if there is a proper correlation between the location or storage tier storing the data set and the type of communication path that the set of client devices 104 is using to perform the I/O operations (block 510). In other words, a determination is made to determine whether the data set stored/located on a storage tier that is relatively hotter, warmer, cooler, colder, etc., than the communication path 202 and/or communication protocol being utilized to perform the I/O operations.

A proper correlation may exist if the location or storage tier storing the data set matches the type of communication path 202 and/or the type of communication protocol utilized by the communication path 202 that the set of client devices 104 is using to perform the I/O operations. Some non-limiting examples of a proper correlation include, but are not limited to, performing I/O operations on a data set stored on a hot tier (e.g., a data set that is relatively frequently accessed) using a fast-speed or low-latency communication path 202 and/or communication protocol, performing I/O operations on a data set stored on a cold tier (e.g., a data set that is relatively infrequently accessed) using a slow-speed or high-latency communication path 202 and/or communication protocol, performing I/O operations on a data set stored on a warm tier using a slower communication path 202 and/or communication protocol, performing I/O operations on a data set stored on a cool tier using a faster communication path 202 and/or communication protocol, performing I/O operations on a relatively large-sized data set using a fast-speed or low-latency communication path 202 and/or communication protocol, performing I/O operations on a relatively small-sized data set using a slow-speed or high-latency communication path 202 and/or communication protocol, performing I/O operations on a relatively small-sized data set using a fast-speed or low-latency communication path 202 and/or communication protocol, performing I/O operations on a relatively large-sized data set using a slow-speed or high-latency communication path 202 and/or communication protocol, and performing background operations (e.g., data replication operations, data mirroring operations, data deduplication operations, garbage collection operations, etc.) using slow-speed or high-latency communication path 202 and/or communication protocol, etc., among other examples that are possible and contemplated herein.

If there is a proper correlation or there is a match between the data set and the communication path/protocol (e.g., a YES), a status signal that does not include a recommendation is transmitted to the set of client devices 104 (block 512). The status signal may be a signal in accordance with a SCSI standard as discussed elsewhere herein.

The method 500 may receive a subsequent I/O request (block 514) and a determination is made to determine if the I/O request is directed to a new data set (block 516). If the I/O request is directed to a new data set (e.g., a YES), method 500 returns to block 502 and the method 500 may be repeated (return 518). If the I/O request is directed to a previously accessed data set (e.g., a NO), method 500 returns to block 504 and at least a portion of the method 500 can be repeated (return 520).

If there is not a proper correlation or there is a mismatch between the data set and the communication path/protocol (e.g., a NO), a status signal including a recommendation to use a different communication path 202 and/or different communication protocol is transmitted to the set of client devices 104 (block 522). In other words, it may be recommended that the set client devices 104 use a hotter, warmer, cooler, colder, etc., communication path 202 and/or communication protocol for one or more subsequent I/O operations on the data set.

The recommendation may be included as a portion of a status signal and/or SENSE code/value(s) similar to the various embodiments discussed elsewhere herein. Further, the recommendation may include a suggestion or hint to use a communication path 202 and/or communication protocol that matches the location and/or size of the data set that is being accessed by the I/O request. Some non-limiting examples of a recommendation include, but are not limited to, performing I/O operations on a data set stored on a hot tier using a corresponding fast-speed or low-latency communication path 202 and/or communication protocol, performing I/O operations on a data set stored on a cold tier using a corresponding slow-speed or high-latency communication path 202 and/or communication protocol, performing I/O operations on a data set stored on a warm tier using a relatively faster communication path 202 and/or communication protocol, performing I/O operations on a data set stored on a cool tier using a relatively slower communication path 202 and/or communication protocol, performing I/O operations on a relatively large-sized data set using a corresponding fast-speed or low-latency communication path 202 and/or communication protocol, performing I/O operations on a relatively small-sized data set using a corresponding slow-speed or high-latency communication path 202 and/or communication protocol, performing I/O operations on a relatively small-sized data set using a corresponding fast-speed or low-latency communication path 202 and/or communication protocol, performing I/O operations on a relatively large-sized data set using a corresponding slow-speed or high-latency communication path 202 and/or communication protocol, and performing background operations using a corresponding slow-speed or high-latency communication path 202 and/or communication protocol, etc., among other examples that are possible and contemplated herein.

The method 500 may receive a subsequent I/O request (block 524) and a determination is made to determine if the I/O request is directed to a new data set as set forth in block 516 (return 526). If the I/O request is directed to a new data set (e.g., a YES), method 500 returns to block 502 and the method 500 may be repeated (return 518). If the I/O request is directed to a previously accessed data set (e.g., a NO), method 500 returns to block 504 and at least a portion of the method 500 can be repeated (return 520).

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an input/output (I/O) module that receives I/O requests from a set of client devices via one of a plurality of communication paths and performs I/O operations on data in one or more storage devices based on corresponding I/O requests; and
   a response module that transmits, to the set of client devices, recommendations of a communication path in the plurality of communication paths for transmitting subsequent I/O requests that access a particular data set in the one or more storage devices based on a current location storing the particular data set,
   wherein:
      the current location is determined when performing a current I/O operation on the particular data set, and
      at least a portion of said modules comprise one or more of hardware circuits, a programmable hardware device, and executable code stored on one or more computer-readable storage media.

2. The apparatus of claim 1, wherein a recommendation is based on the current location storing the particular data set and a previous location storing the particular data set.

3. The apparatus of claim 2, wherein:
   the recommendation forms at least a portion of a status signal transmitted to a client device subsequent to performing the current I/O operation; and
   the status signal comprises SENSE code in which at least a portion of the SENSE code comprises the recommendation.

4. The apparatus of claim 1, wherein each of the plurality of communication paths provides a different speed.

5. The apparatus of claim 4, wherein:
   a first recommendation includes a first suggestion to use a relatively fast communication path for relatively frequently accessed data sets; and
   a second recommendation includes a second suggestion to use a relatively slow communication path for relatively infrequently accessed data sets.

6. The apparatus of claim 4, wherein:
   one or more data sets are replicated for storage in a different location; and
   a recommendation recommends use of a relatively slow communication path for replicating the one or more data sets.

7. The apparatus of claim 1, wherein:
   at least one storage device comprises a topology comprising a plurality of tiers that store a plurality of data sets;
   each data set is stored on a tier based on a frequency of access; and
   the recommendations are based on the tier storing each respective data set.

8. The apparatus of claim 7, wherein:
   a first recommendation includes a first suggestion to use a relatively fast communication path for first data set on a first tier storing relatively frequently accessed data sets; and
   a second recommendation includes a second suggestion to use a relatively slow communication path for second data sets on a second tier storing relatively infrequently accessed data sets.

9. The apparatus of claim 1, wherein the recommendations are based on correlations between the current location of the particular data set and a relative speed of each communication path.

10. The apparatus of claim 9, wherein the response module further recommends a different communication path for a subsequent I/O when a correlation between the current location of the particular data set and the relative speed of a current communication path accessing the particular data set are a mismatch.

11. The apparatus of claim 10, wherein:
   the response module recommends a faster communication path when the particular data set is located on a first tier storing data sets that are accessed relatively frequently; and
   the response module recommends a slower communication path when the particular data set is located on a second tier storing data sets that are accessed relatively infrequently.

12. A method, comprising:
   receiving input/output (I/O) requests from a set of client devices via one of a plurality of communication paths;
   performing I/O operations on data in one or more storage devices based on corresponding I/O requests; and
   transmitting, to the set of client devices, recommendations of a communication path in the plurality of communication paths for transmitting subsequent I/O requests that access a particular data set based on a current location storing the particular data set,
   wherein the current location is determined when performing a current I/O operation on the particular data set.

13. The method of claim 12, wherein a recommendation is based on the current location storing the particular data set and a previous location storing the particular data set.

14. The method of claim 13, wherein:
   the recommendation forms at least a portion of a status signal transmitted to a client device subsequent to performing the current I/O operation; and
   the status signal comprises SENSE code in which at least a portion of the SENSE code comprises the recommendation.

15. The method of claim 12, wherein the recommendations are based on correlations between the location of the particular data set and a relative speed of each communication path.

16. The method of claim 15, further comprising:
   recommending a different communication path for a subsequent I/O when a correlation between the current location of the particular data set and the relative speed of a current communication path accessing the particular data set are a mismatch,
   wherein recommending comprises:
      recommending a faster communication path when the particular data set is located on a first tier storing data sets that are accessed relatively frequently, and
      recommending a slower communication path when the particular data set is located on a second tier storing data sets that are accessed relatively infrequently.

17. A computer program product comprising a computer-readable storage medium including program instructions embodied therewith, the program instructions executable by a processor to cause the processor to:

receive input/output (I/O) requests from a set of client devices via one of a plurality of communication paths;
perform I/O operations on data in one or more storage devices based on corresponding I/O requests; and
transmit, to the set of client devices, recommendations of a communication path in the plurality of communication paths for transmitting subsequent I/O requests that access a particular data set based on a location storing the particular data set,
wherein:
the current location is determined when performing a current I/O operation on the particular data set.

18. The computer program product of claim 17, wherein a recommendation is based on the current location storing the particular data set and a previous location storing the particular data set.

19. The computer program product of claim 18, wherein:
the recommendation forms at least a portion of a status signal transmitted to a client device subsequent to performing the current I/O operation; and
the status signal comprises SENSE code in which at least a portion of the SENSE code comprises the recommendation.

20. The computer program product of claim 17, wherein:
the recommendations are based on correlations between the location of the particular data set and a relative speed of each communication path;
the program instructions further causing the processor to:
recommend a different communication path for a subsequent I/O when a correlation between the location of the particular data set and the relative speed of a current communication path accessing the particular data set are a mismatch; and
the program instructions causing the processor to recommend the different communication path comprises program instructions further causing the processor to:
recommend a faster communication path when the particular data set is located on a first tier storing data sets that are accessed relatively frequently; and
recommend a slower communication path when the particular data set is located on a second tier storing data sets that are accessed relatively infrequently.

* * * * *